United States Patent
Nagano et al.

[11] Patent Number: 6,166,818
[45] Date of Patent: Dec. 26, 2000

[54] INTERFERENCE MEASUREMENT APPARATUS, INTERFERENCE MEASUREMENT PROBE AND INTERFERENCE MEASUREMENT CONTROL SYSTEM

[75] Inventors: Shigenori Nagano; Nobuo Hori; Makoto Fujino, all of Tokyo, Japan

[73] Assignee: Kabushiki Kaisha Topcon, Tokyo, Japan

[21] Appl. No.: 09/182,506

[22] Filed: Oct. 30, 1998

[30] Foreign Application Priority Data

Oct. 31, 1997 [JP] Japan .................................. 9-314621

[51] Int. Cl.[7] ...................................................... G01B 9/02
[52] U.S. Cl. ............................................ 356/503; 356/504
[58] Field of Search ..................................... 356/345, 356, 356/357, 358, 399

[56] References Cited

U.S. PATENT DOCUMENTS

| | | | |
|---|---|---|---|
| 4,909,629 | 3/1990 | Yokokura et al. | 356/358 |
| 5,329,356 | 7/1994 | Tabarelli et al. | 356/358 |
| 5,486,923 | 1/1996 | Mitchell et al. | 356/356 |

FOREIGN PATENT DOCUMENTS 64-12206  1/1989  Japan .

*Primary Examiner*—Robert Kim
*Attorney, Agent, or Firm*—Foley & Lardner

[57] ABSTRACT

An optical system is fabricated in the form of one device, so that the simplified optical system is realized. A displacement is measured with a high resolving power utilizing an interference fringe. An interference measurement probe 2 receives a coherent light from a light source section 1, and divides the coherent light into a plurality of luminous fluxes. The interference measurement probe 2 emits a plurality of irradiation luminous fluxes at different angles. The plurality of irradiation luminous fluxes form an interference fringe and the interference fringe is irradiated onto an objective 8. A light receiving section 3 is disposed at a position where a reflection luminous flux from the objective 8 interferes, and receives an interference light reflected from the objective 8, thereby outputting a light receiving signal which is converted to an electric signal. A measurement section 4 performs processing for obtaining displacement of positions of the interference measurement probe 2 and the light receiving section 3 as well as displacement of the objective 8. A control section 5 is connected to a driving section 6, and controls the driving section 6 based on a measurement result of the measurement section 4, thereby making a stage 7 move in the Z-direction. On the stage 7, the objective 8 is mounted or provided.

20 Claims, 13 Drawing Sheets

| | |
|---|---|
| WAVELENGTH | $\lambda = 830nm$ |
| BEAM SECTION DIAMETER | $\phi = 2.0mm\phi$ |
| INCIDENCE BEAM ANGLE | $\theta_1 = 70°$, $\theta_1 = 70°\ 2'\ 32'$ |
| | ( ANGLE DIFFERECE: $\alpha = 2'\ 32'$ ) |
| CYCLE OF INTERFERNCE FRINGE | $\Lambda = 1126.3 \mu m$, |
| DYNAMIC RANGE (THEORY) ; | $\pm 599 \mu m$, ($\Lambda' = 1198.6 \mu m$) |

FIG. 10A

| Dynamic Range: $\pm z_D$ | ① $\pm 150 \mu m$ | ② $\pm 250 \mu m$ | ③ $\pm 25 \mu m$ |
|---|---|---|---|
| Resolution: $\Delta z$ | $\pm 0.42 \mu m$ | $\pm 0.69 \mu m$ | $\pm 0.07 \mu m$ |

FIG. 10B

INTERFERENCE MEASUREMENT APPARATUS, INTERFERENCE MEASUREMENT PROBE AND INTERFERENCE MEASUREMENT CONTROL SYSTEM

BACKGROUND OF THE INVENTION

The present invention relates to an interference measurement apparatus of a high resolution, an interference measurement probe used for such interference measurement apparatus, and an interference measurement control system having an interference measurement apparatus and an interference control apparatus.

A Z-displacement sensor has been generally used as a sensor section for focussing on objective lens in, for example, a precise position control system. A focussing technology of the objective lens is applied to, for example, an auto-focussing mechanism. Among the Z-displacement sensors, an optical lever system has been known as an optical Z-displacement sensor.

FIG. 14 is a perspective view showing an operation principle of the optical lever system. The constitution composed of the components surrounded by the dotted lines is called the Z-displacement sensor (Z sensor).

First, a beam of light from a laser 141 is irradiated onto a objective 143 via a light projection system 142. A reflected light from a objective 143 is incident onto a light receiving section 145 via a magnifying projection optical system 144. With such constitution, a focus point of the optical system is previously adjusted where the point image of the laser beam is formed just on the plane of the objective. When the focal shift occurs, in the light receiving section 145 the image moves in accordance with the amount of defocusing.

Consequently, a feedback control for the sending mechanism of a Z-stage of the objective is performed using a positional shift of a spot image as an error signal, whereby an autofocus mechanism can be realized.

However, an optical system has not been heretofore fabricated in the form of one device, so that an extra optical element must be inserted between the objective lens and the objective. Moreover, since the measurement section measures the position shift of the spot image, there has been a limitation to a resolving power.

SUMMARY OF THE INVENTION

The object of the present invention is to provide an interference measurement apparatus, an interference measurement probe and an interference measurement control system, which are capable of realizing a simple optical system by fabricating it in the form of one device and capable of performing measurement with a high resolving power by utilizing interference fringes.

Another object of the present invention is to provide a an interference measurement apparatus, an interference measurement probe and an interference measurement control system, in which by adopting a phase modulation heterodyne interference method, a detection/measurement precision is not affected by a power variation of a laser light source and a high detection resolving power is exhibited by detecting a phase difference of an interference beat signal.

Still another object of the present invention is to make it possible to perform a direction discrimination using one light receiving device such as a photo-detector.

According to the first solving means of the present invention, an interference measurement apparatus is provided, which comprises:

a light source for emitting a coherent light;

an optical waveguide section which receives the coherent light from the light source, divides the coherent light into at least two luminous fluxes and emits these luminous fluxes;

an irradiation section which receives the at least two luminous fluxes emitted from the optical waveguide section, and irradiates at least two irradiation luminous fluxes in different directions to form an interference light;

a light receiving section for receiving the interference light by being disposed at a position where the at least two irradiation luminous fluxes interfere, thereby outputting a light receiving signal; and a measurement section which obtains displacement of the irradiation section and the light receiving section based on the light receiving signal outputted from the light receiving section.

According to the second solving means of the present invention, an interference measurement apparatus is provided, which comprises:

a light source for emitting a coherent light;

an optical waveguide section which receives the coherent light from the light source, divides the coherent light into at least two luminous fluxes and emits these luminous fluxes;

an irradiation section which receives the at least two luminous fluxes emitted from the optical waveguide section, and irradiates the at least two irradiation luminous fluxes onto an objective at different angles, thereby forming an interference light;

a light receiving section for receiving the interference light by being disposed at a position where at least two reflection or transmission luminous fluxes interfere, the at least two reflection or transmission luminous fluxes being reflected from the objective or transmitting therethrough, thereby outputting an light receiving signal; and a measurement section which obtains displacement of the objective based on the light receiving signal outputted by the light receiving section. According to the third solving means of the present invention, an interference measurement probe is provided, which comprises:

an optical waveguide which receives a coherent light, divides the coherent light into at least two luminous fluxes and emits them; and an irradiating section which receives the at least two luminous fluxes emitted by the optical waveguide and irradiates at least two irradiation luminous fluxes at different directions, thereby forming a measurement region where the at least two irradiation luminous fluxes interfere.

Furthermore, according to the forth resolving means of the present invention, an interference measurement control system is provided, which performs a control for focussing etc. using these interference measurement apparatus.

BRIEF DESCRIPTION OF THE DRAWINGS

For a more complete understanding of the present invention and the advantages thereof, reference is now made to the following description taken in conjunction with the accompanying drawings.

FIGS. 10A and 10B show a table showing each of the physical values for securing a desired dynamic range.

Figure 1:
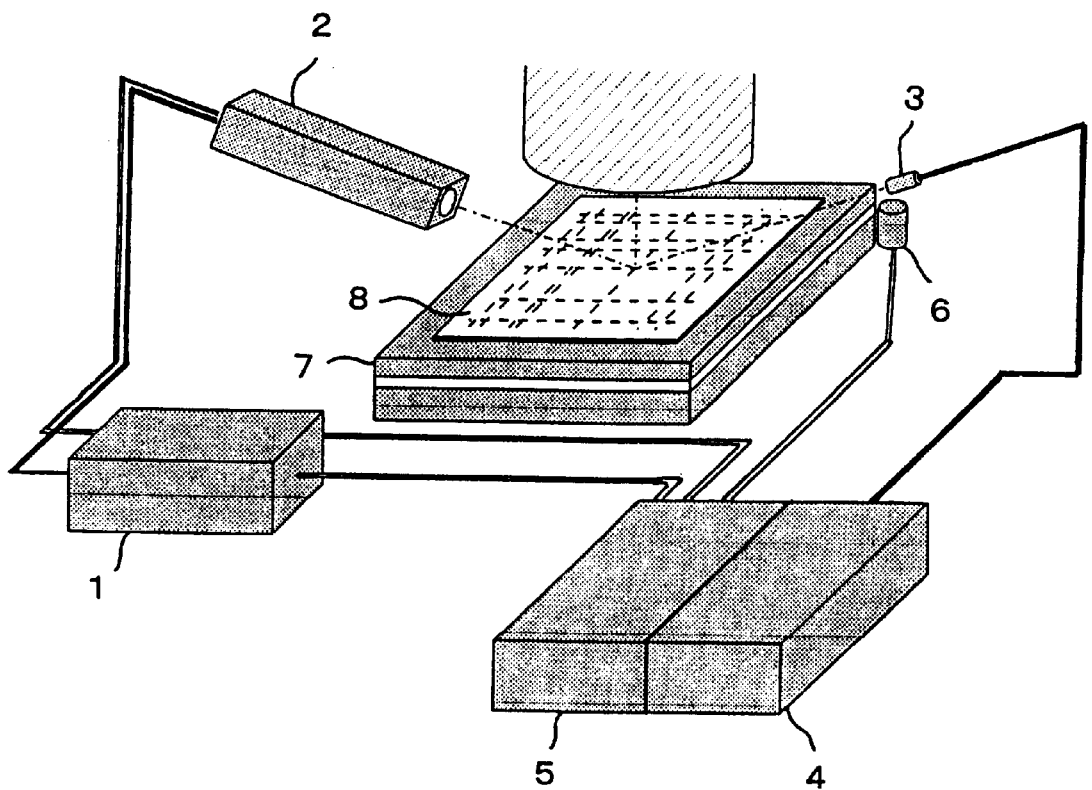
FIG. 1 shows a whole constitutional view of a first embodiment of an interference measurement system according to the present invention.

DETAILED DESCRIPTION OF THE PREFERRED EMBODIMENTS (1) First embodiment of interference measurement control system In FIG. 1, a whole constitutional view of a first embodiment of an interference measurement control system according to the present invention is shown.

The interference measurement control system comprises an interference measurement apparatus and an interference control apparatus. The interference measurement apparatus comprises a light source section 1, a interference measurement probe 2, a light receiving section 3 and a measurement section 4. A interference control apparatus comprises a control section 5, a driving section 6 and a stage 7. Moreover, among connection lines, double lines show an electric signal line, and one thick lines show a fiber line.

First, the descriptions for the interference measurement apparatus will be made.

The light source section 1 includes, for example, a laser diode and emits a coherent light. The interference measurement probe 2 receives the coherent light from the light source section 1, divides the coherent light into a plurality of luminous fluxes, and emits a plurality of irradiation luminous fluxes in different directions. These luminous fluxes forms interference fringes, and are irradiated onto the objective 8. The light receiving section 3 is constituted by a fiber probe connected to a photodiode or the like, and disposed at a position where the reflection luminous fluxes from the objective 8 interfere with each other. The light receiving section 3 receives the interference light reflected from the objective 8, and outputs a light receiving signal obtaining by converting it to an electric signal. The measurement section 4 has a signal processor, and performs processings for obtaining the displacement of the positions of the interference measurement probe 2 and the light receiving section 3 or the displacement of the objective 8. The light receiving section 3 may be formed by making a photodiode disposed at a position where the interference light is directly inputted.

Subsequently, the description for the interference control apparatus will be made. The control section 5 is connected to the light source section 1 so that the light source section 1 operates stably, and is connected to the interference measurement probe 2 for driving a phase modulator. The control section 5 is also connected to the driving section 6 and controls the driving section 6 based on measurement results of the measurement section 4, thereby moving the stage 7 in the Z-direction. The driving section 6 is constituted by a piezo-element etc., which is capable of allowing the stage 7 to finely change its position in response to an input signal. On the stage 7, the objective 8 is mounted or provided.

With such a constitution, the measurement section 4 can measure the displacement of the stage 7, for example, by receiving the amount of light of the interference fringes by the light receiving section 3. Moreover, the control section 5 can perform the position adjustment such as focussing, for example, by allowing the stage 7 to change its position so as to maximize the light amount of the interference fringes received by the light receiving section 3.

Next, the interference measurement probe 2 will be described in detail.

Figure 2:
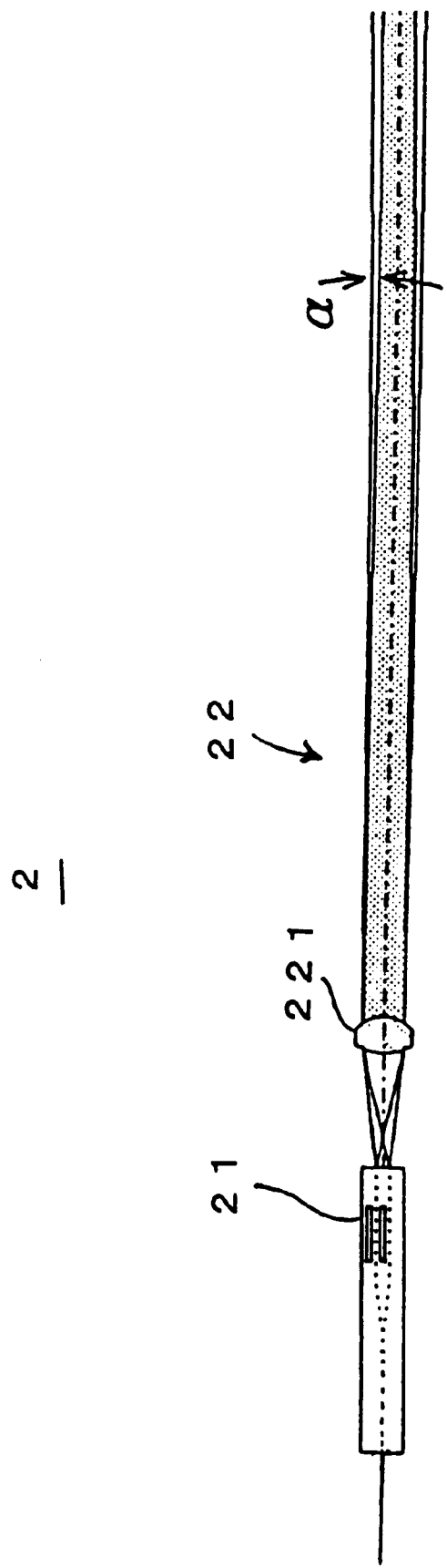
FIG. 2 shows a constitutional view of an interference measurement probe according to the present invention.

In FIG. 2, a constitutional view of an interference measurement probe of the present invention is shown.

The interference measurement probe 2 comprises a waveguide section 21 and an irradiation section 22. Into the waveguide section 21, a coherent light is incident from the light source section, and divides the coherent light into at least two luminous fluxes and emits them. Here, as an example, the case where the coherent light is divided into two luminous fluxes will be described. As the width of the waveguide, for example, 3 to 5 μm is selected, and as the interval of the two luminous fluxes in the end surface of the waveguide section 21, for example, 10 to 200 μm is selected. However, each of these values is not limited to the above and can be suitably selected. The two irradiation luminous fluxes emitted from the end surface of the waveguide section 21 are incident to the irradiation section 22.

The irradiation section 22 converts two parallel beams having a small incidence angle difference α, using, for example, the collimator lens 221. In order to form the parallel beams, the distance between the collimator lens 221 and the end surface of the waveguide section 21 is equal to the focal length of the collimator lens 221, for example, about 20 mm, or it may be nearly equal to about the focal length. These two parallel beams overlap almost all over the region, when they are emitted from the collimator lens 221, so that the interference fringes are created almost all over the region.

Moreover, the irradiation section 22 can be alternatively constituted to irradiate with different directions from each other so that at least two luminous fluxes obtained by the waveguide section 21 approximately form a beam waist on the objective.

An operation principle for measuring the amount of displacement with the interference fringes will be described.

Figure 3A:
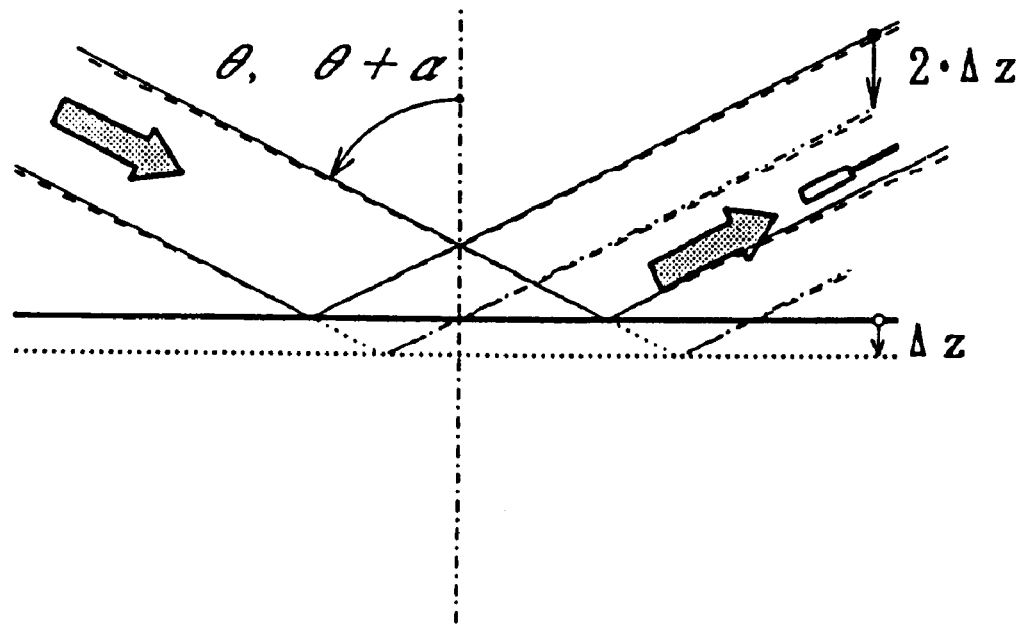
FIGS. 3A and 3B show an explanatory view for obtaining the amount of displacement from an interference intensity.
Figure 3B:
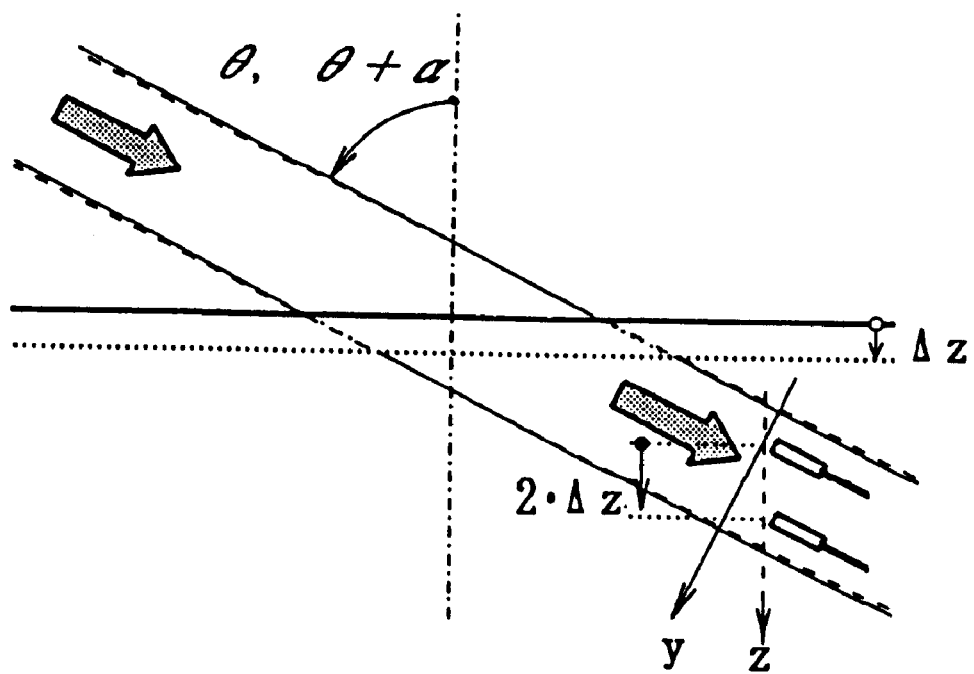

In FIGS. 3A and 3B, an explanatory view for obtaining the amount of displacement from the interference fringes is shown.

As shown in FIG. 3A, it is assumed that one of the two parallel irradiation luminous fluxes emitted from the interference measurement probe 2 is irradiated onto the objective 8 in a direction inclined by θ relative to the z-direction, the other is irradiated onto the objective 8 in a direction inclined by θ+α relative to the z-direction, and they are reflected by the objective 8 and received by the light receiving section 3. Here, when the objective 8 moves in the z-direction by Δz, the light receiving section 3 takes in energy of an interference field in another portion other than the received luminous flux before the movement. Specifically, this implies that in the formed stationary type interference fringe distribution, the light receiving section is scanned by 2·Δz, accompanied with the movement of the objective in the z-direction.

FIG. 3B shows the above described fact by modifying FIG. 3A so as to facilitate understanding for it. The light receiving section 3 can read out the displacement amount Δz from the change of such interference intensity.

Here, the intensity distribution of the stationary type interference fringes will be described in detail.

Figure 4A:
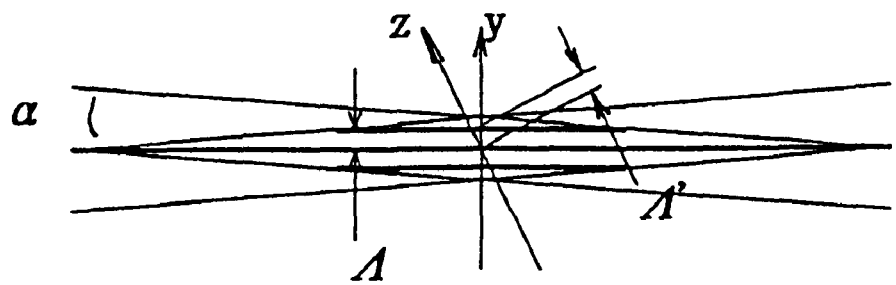
FIGS. 4A and 4B show an explanatory view of an intensity distribution of a stationary wave type interference fringe.
Figure 4B:
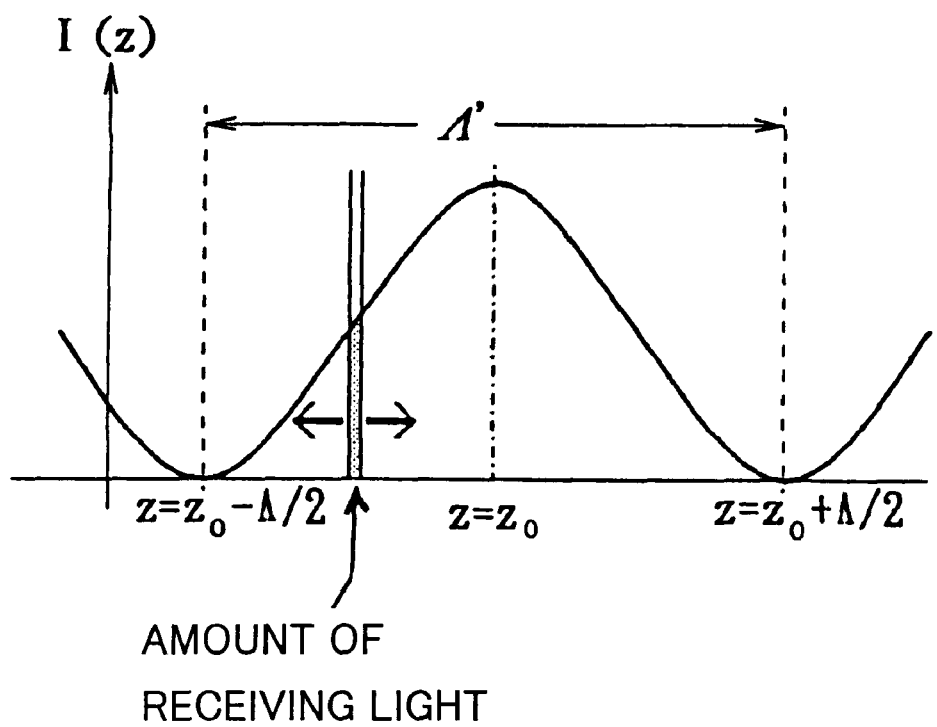

In FIGS. 4A and 4B, an explanatory view of the intensity distribution of the stationary type interference fringes is shown. In FIGS. 4A and 4B, the intensity distribution in the homodyne interference is shown as an example.

The two parallel beams emitted from the interference measurement probe 2 are irradiated while keeping the angle difference α. At this time, the interference fringes are formed at the position where the two parallel beams overlap, and the cycle thereof is Λ. In FIGS. 4A and 4B, the intensity distribution of the stationary type interference fringes generated by the two parallel beams having the angle difference a is expressed by the following expression, when the incidence luminous fluxes exhibit a uniform intensity distribution.

$$I(y) = 2 \cdot \left[1 + \cos\frac{2\pi}{\Lambda}y\right]$$

$$\Lambda = \lambda/2 \cdot \sin(\frac{\alpha}{2})$$

Therefore, the interference intensity distribution in the z-direction is expressed by the following expression.

$$I(z) = 2 \cdot \left[1 + \cos\frac{2\pi}{\Lambda'}z\right]$$

$$\Lambda' = \frac{\Lambda}{\sin\theta} = \lambda / \left[2 \cdot \sin(\frac{\alpha}{2}) \cdot \sin\theta\right]$$

It is noted that the theoretical expression of the interference infringes is the one in the y-direction (the vertical direction to the interference fringes) and the measurement section 4 is required to obtain the displacement in the z-direction, actually. Consequently, based on the angle to intersect the interference fringes formed by the plurality of irradiated luminous fluxes, that is, based on the angle difference between the y and z-directions, the obtained displacement is converted, whereby the displacements of the interference measurement probe 2 (irradiation section 21) and the light receiving section 3 can be obtained.

Here, Λ and Λ' represent the cycles in the y and z-directions of the interference fringes, respectively.

Therefore, as shown in FIG. 4B, when the dynamic range is determined by limiting to one cycle Λ' of the interference fringes, the amount of received light is measured by the light receiving element such as a detector or a fiber, which has a far smaller diameter than the beam diameter. Utilizing the position where the amount of the received light becomes maximum, the displacement amount in the z-direction can be measured with a high resolution power. As a matter of course, if it is counted how many cycles the interference fringes move, the displacement in a range beyond one cycle can be measured.

As described above, according to the present invention, by the plurality of parallel irradiation luminous fluxes emitted from the interference measurement probe 2, the light with the interference fringe intensity is received, whereby the displacement can be measured with an extremely high resolving power.

(2) Interference measurement apparatus adopting modulation method

The description for the interference measurement apparatus adopting the homodyne method was done in the above. Next, an interference measurement apparatus employing a modulation method, particularly, a phase modulation method, will be described.

Figure 5:
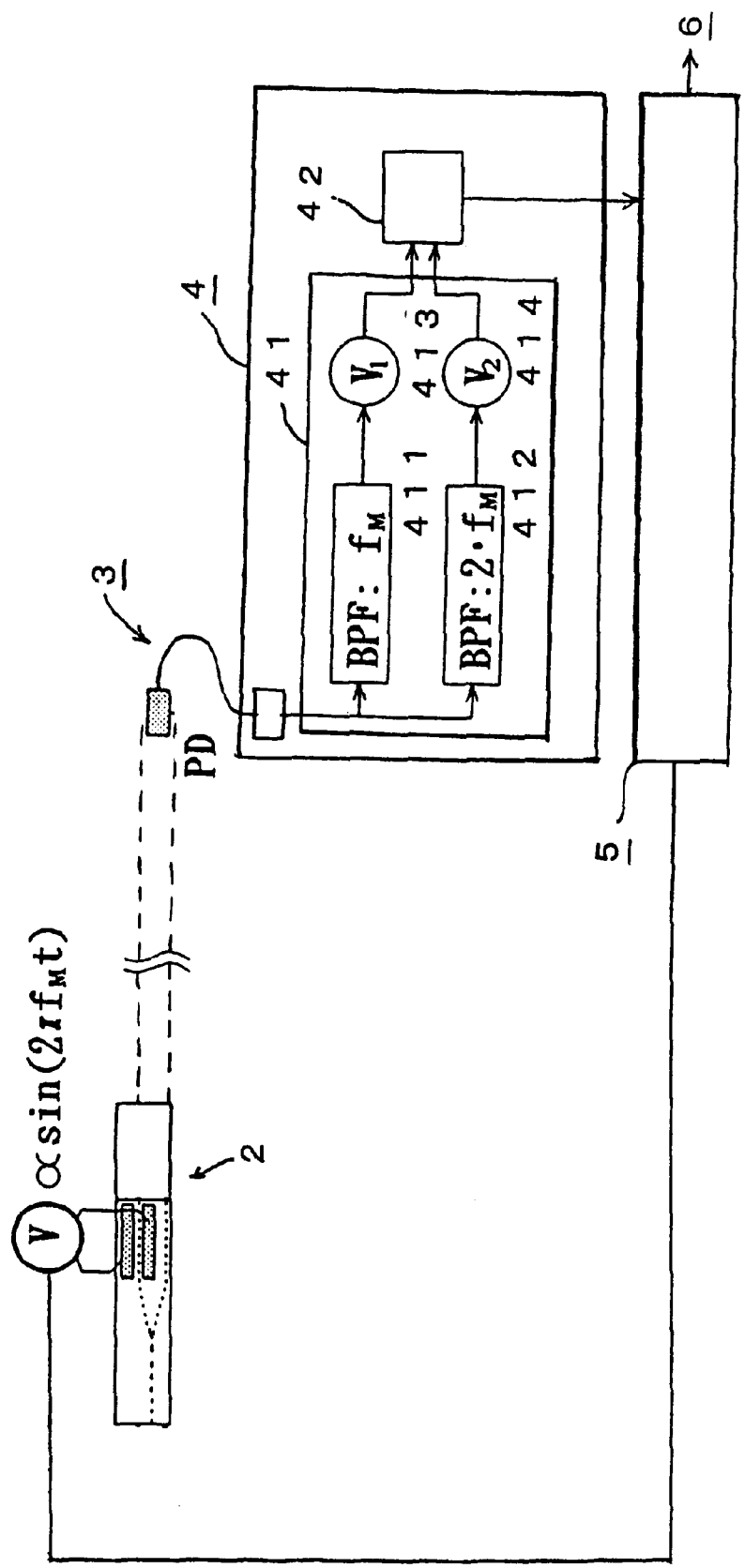
FIG. 5 shows an explanatory view for an interference measurement in a phase modulation system.

In FIG. 5, an explanatory view for an interference measurement in a phase modulation method is shown.

As described later, in the interference measurement probe 2, a phase modulation section is provided in at least one waveguide of the waveguide section 21. This phase modulation section undergoes the phase modulation control by a fundamental frequency $f_M$ from the control section 5. This can be achieved, for example, by applying a voltage of $\sin(2\pi f_M t)$ to the phase modulation section.

On the other hand, the measurement section 4 comprises a signal extraction section 41 and a displacement measurement section 42. The measurement section 41 extracts a fundamental signal having a frequency equal to the modulation frequency of the modulation section and a sub-signal having a frequency twice the modulation frequency. Specifically, the receiving signal from the light receiving section 3 is outputted to the band pass filters 411 and 412, which respectively possess the properties of $f_M$ and $2 \cdot f_M$. Next, the amplitude values V1 and V2 of the fundamental signal and the sub-signal passing through the corresponding band pass filters 411 and 412 are obtained by the corresponding detection circuits 413 and 414, and outputted to the displacement measurement section 42. The displacement measurement section 42 obtains the displacement from the phase of the fundamental signal and the sub-signal extracted by the signal extraction section 41. Descriptions of the concrete computation for obtaining the displacement amount in the z-direction will be made later.

Here, the constitution of the waveguide section and the manufacturing method thereof will be described in detail.

In FIGS. 6A to 6D, an example of the manufacturing steps of the waveguide section is shown.

Figure 6A:
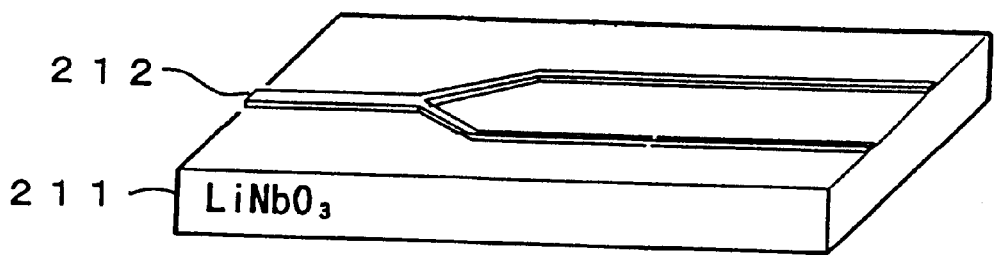
FIGS. 6A to 6D show manufacturing steps of a waveguide section.
Figure 6B:
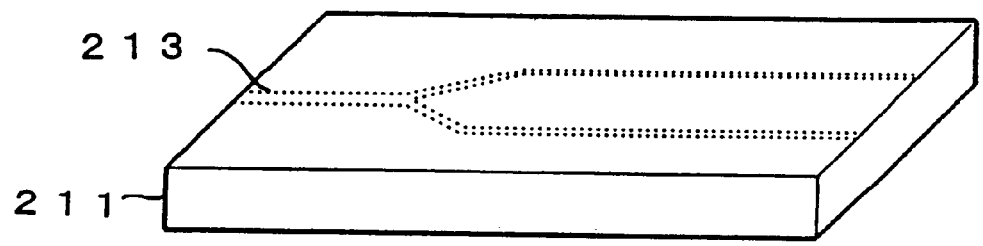
Figure 6C:
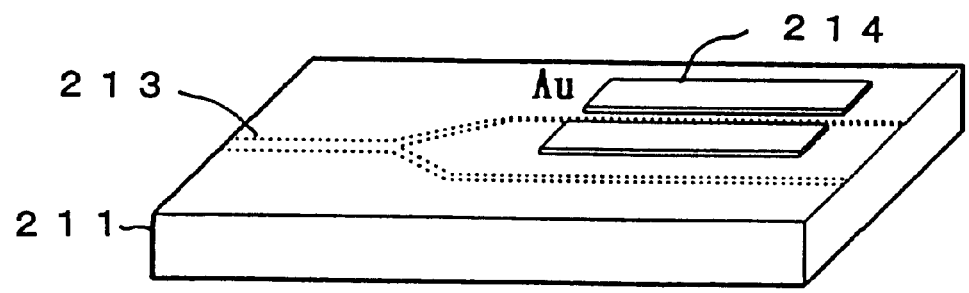

First, as shown in FIG. 6A, using a photolithography technique, a metal 212, Ti etc., is evaporated in the shape of a desired waveguide pattern on the surface of a single crystal substrate 211, for example, $LiNbO_3$ or $TaNbO_3$. Subsequently, as show in FIG. 6B, by heating the single crystal substrate 211 with an electric furnace or the like, the metal 212 is thermally diffused inward the substrate. As a result, a buried type waveguide 213 having a pattern shape is formed. Where, for example, a light passing through the buried type waveguide adopting the phase modulation method, after the waveguide 213 is formed, a light control electrode 214 can be formed in a desired position as shown in FIG. 6C. A metallic material offering a good electric conductivity is used as the material forming the light control electrode section 214. Generally, a gold (Au) etc. which is stable with time can be used by evaporation.

Figure 6D:
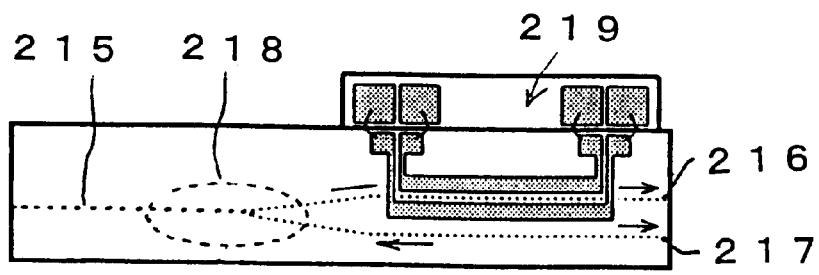

Thus, as shown in FIG. 6D, formed are a incidence waveguide 215 into which a coherent light from the light source section 1 is incident, at least two emission waveguides 216 and 217 for emitting a light, and a wave separation section 218 which divides the light in the waveguide 215 into the two emission waveguides 216 and 217. Moreover, according to demand, a modulation section 219 which, in the emission waveguide 216 or 217, modulates any of at least two luminous fluxes divided by the wave separation section 218 may be formed. Noted that in the case of the homodyne method, the constitution of the modulation section may be omitted.

Figure 7B:
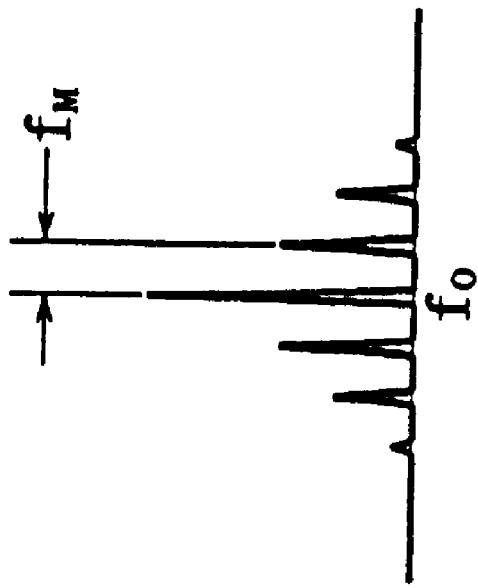
FIGS. 7A and 7B show an explanatory view of a generation of a row of side bands by a phase modulation.
Figure 7A:
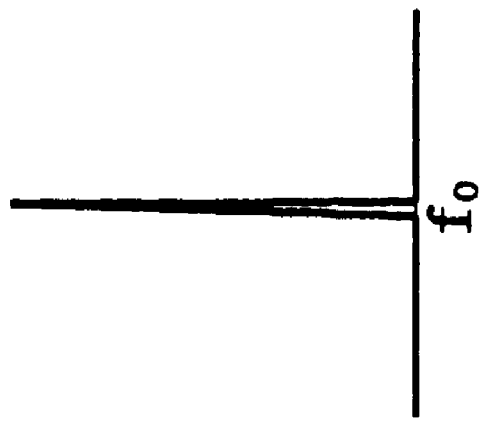

Furthermore, an explanatory view of generation of rows of side bands by the phase modulation is shown in FIGS. 7A and 7B.

As shown in FIG. 7A, single mode spectrum undergoes the phase modulation, whereby side band waveform spectrum as is shown in FIG. 7B can be generated. Intervals between each spectrum are equal to the fundamental frequency $f_M$ used for the modulation.

Figure 8:
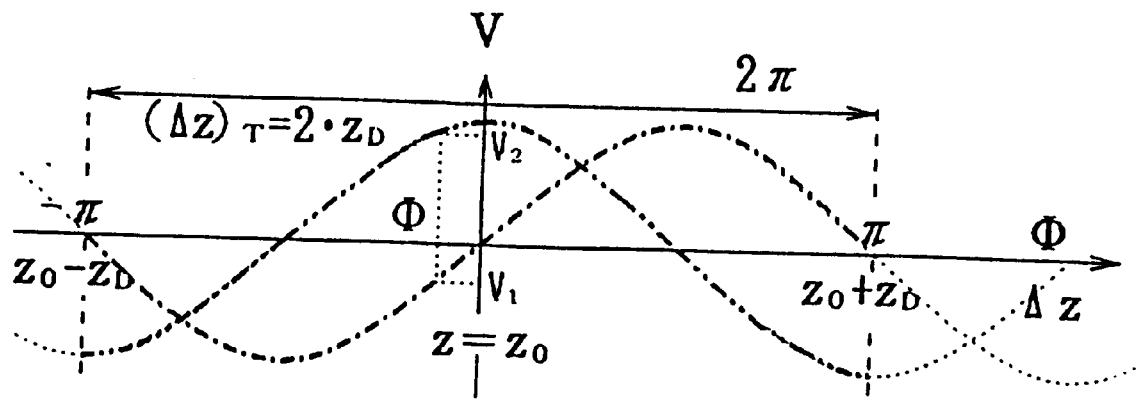
FIG. 8 shows an explanatory view of an interference signal by the phase modulation system.

In FIG. 8, waveforms of an interference signal produced by the phase modulation method is shown.

In the phase modulation method, the interference intensity I is measured as the amplitude changes V1 and V2. One of them is measured as the amplitude change V2 of the sub-signal of the double wave component $2 \cdot f_M$ of the modulated frequency. The other is measured as the amplitude change V1 of the fundamental signal of the component of the fundamental frequency $f_M$, which has the waveform ahead of the interference signal of the sub-signal by $\pi/2$. In the case of the phase modulation method, two signals which are different in the phase by $\pi/2$ can be independently taken out from the one interference signal. The maximum amplitudes of these two signals can be made coincident with each other by controlling the magnitude of the applied voltage to the phase modulation section (see the Publication of Unexamined Japanese Patent Application No. 64-12206, if necessary).

In the measurement section 4, the following $\Phi$ is directly computed from these two kinds of signals. Therefore, the displacement amount in the z-direction is obtained as follows.

$$\frac{V_1}{V_2} = \tan\Phi$$

$$\therefore \Phi = \tan^{-1}\left\{\frac{V_1}{V_2}\right\}$$

$$\Delta z = \frac{\Phi}{2r} \frac{\lambda}{4 \cdot (\cos\theta_1 - \cos\theta_2)} = \frac{\Phi}{2r}\Delta z_T$$

Figure 9:
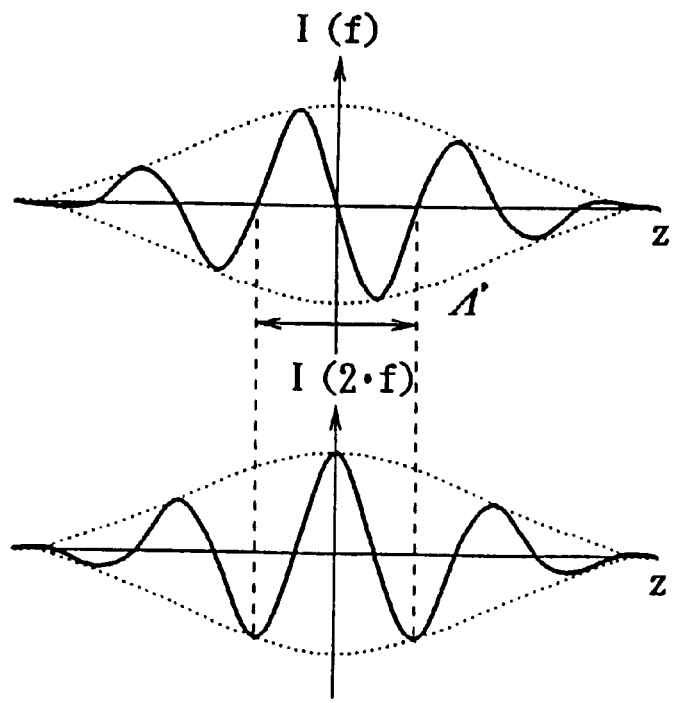
FIG. 9 shows an explanatory view of an intensity distribution of an interference fringe of the phase modulation system.

Next, in FIG. 9, an explanatory view of the intensity distribution of the interference fringes according to the phase modulation method is shown.

In the phase modulation method, two kinds of signals which have different phases from each other by $\pi/2$ in each point. Moreover, since the incidence beam is actually a Gaussian beam, a section electric field distribution of the incidence beam is shown in FIG. 9, when the intensity distribution of the stationary type interference fringes is illustrated according to actualities.

In the light receiving section 3, the light receiving output obtained by multiplexing these two kinds of signals can be obtained. The measurement section 4 separates this multiplexed signal to obtain each of the received signals. Moreover, by comparing the waveforms of these two kinds of signals, the measurement section 4 can determine the direction of the displacement. The control section 5 can immediately execute a desired control depending on the measurement results of the measurement section 4. As described above, by the use of the modulation technique, particularly, the phase modulation technique, even when the amplitude of the interference signal varies, it is possible to achieve a high resolving power by the direction discrimination and the computation.

In FIGS. 10A and 10B, a table illustrating each of physical values for securing a desired dynamic range is shown.

FIG. 10A illustrates each of the physical values for securing the dynamic range of about ±600 μm, as an example. The way how to set the incidence beam angle shown here, as well as the dynamic range and the resolving power, can be suitably set according to demand.

FIG. 10B shows the relationship between the dynamic range and the resolving power (resolution). When the phase angle reading resolving power $\Delta\Phi$ is set to 1° (±0.5°), the resolving power $\Delta Z$ of the Z displacement amount is given by the following expression. Therefore, the resolving power $\Delta Z$ changes by the dynamic range $\pm Z_D$.

$$\Delta Z = 2|Z_D|/360$$

Therefore, as the dynamic range becomes wider, the resolving power becomes lower. In the above explanation, the phase modulation method by means of the fundamental frequency and the frequency twice the fundamental frequency was adopted. The present invention is not limited to this. In addition, a phase modulation method using an arbitrary phase difference and other phase modulation methods may be appropriately adopted.

Figure 11:
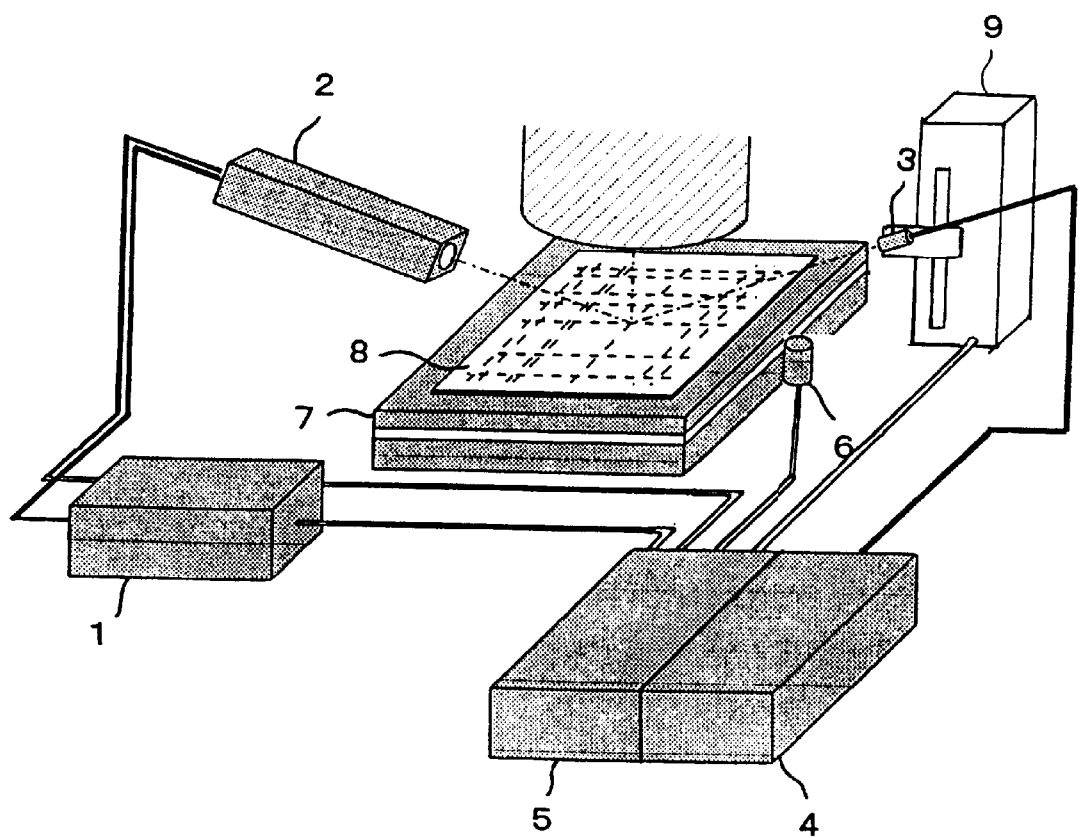
FIG. 11 shows a constitutional view for enlarging the dynamic range.

(3) Interference measurement control system comprising relative movement section Next, in FIG. 11, a constitutional view for widening the dynamic range is shown.

The constitution shown in FIG. 11 further comprises, for example, the relative movement section 9 so as to widen the dynamic range. The relative movement section 9 allows the interference measurement probe 2 (irradiation section 21) and the light receiving section 3 to relatively move in a direction to intersect the interference fringes. The relative movement section 9 may be provided in either side of the interference measurement probe 2 or the light receiving section 3. The measurement section 4 can obtain the displacement based on the movement amount of the relative movement section 9 and the light received output of the light receiving section 3.

For example, at a first position, a first movement is first obtained by measuring the interference fringes. Subsequently, by moving the relative movement section 9, the position of the light receiving section 3 is moved to a second position within the area of the luminous flux, and then a second displacement is similarly obtained by measuring the interference fringes. The movement amount of the relative movement section 9 at this time is considered in order to obtain the first and second displacements, whereby the displacements of the first and second positions can be measured. Consequently, the dynamic range can be widened. Noted that a technique of an optical lever can be applied at the time of the displacement.

(4) Second embodiment of interference measurement control system

Figure 12:
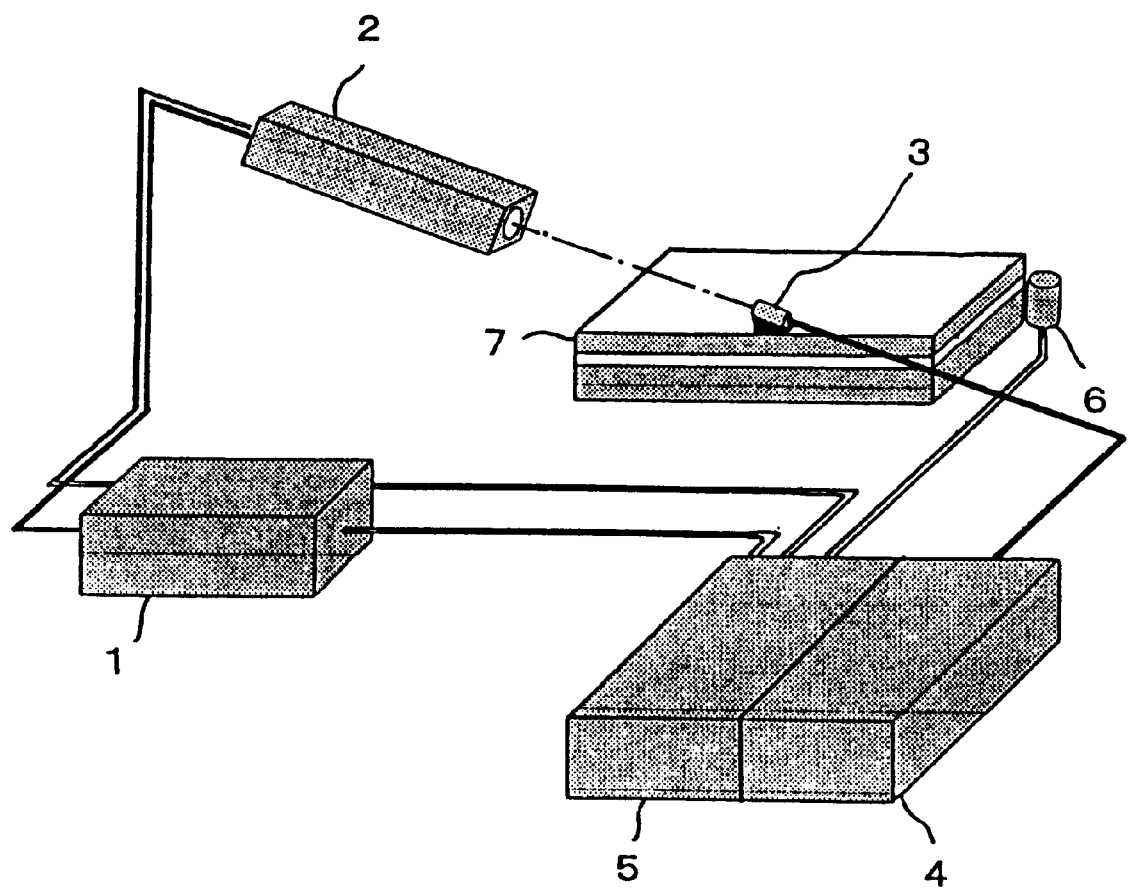
FIG. 12 shows a whole constitutional view of a second embodiment of an interference measurement control system according to the present invention.

FIG. 12 shows a whole constitutional view of a second embodiment of an interference measurement control system according to the present invention.

The difference of the interference measurement control system of the second embodiment from that of the first embodiment is that the light receiving section 3 and the stage 7 are united with each other. Other constitutions and an operation of the second embodiment are also the same as those of the first embodiment.

With such constitution, the measurement section 4 can directly measure the displacement of the light receiving section 3. Moreover, the control section 5 can directly control the position of the light receiving section 3. In FIG. 12, the light receiving section 3 is fixed to the stage 7. However, the stage 7 is not always necessary to be particularly provided. The displacement of the light receiving section 3 itself can also be measured.

(5) Application of interference measurement control system

Next, an application example of the measurement apparatus of the present invention will be described.

Moreover, the measurement apparatus of the present invention can be applied to an autofocus adjustment such as an optical microscope, an electromicroscope and a camera.

Figure 13A:
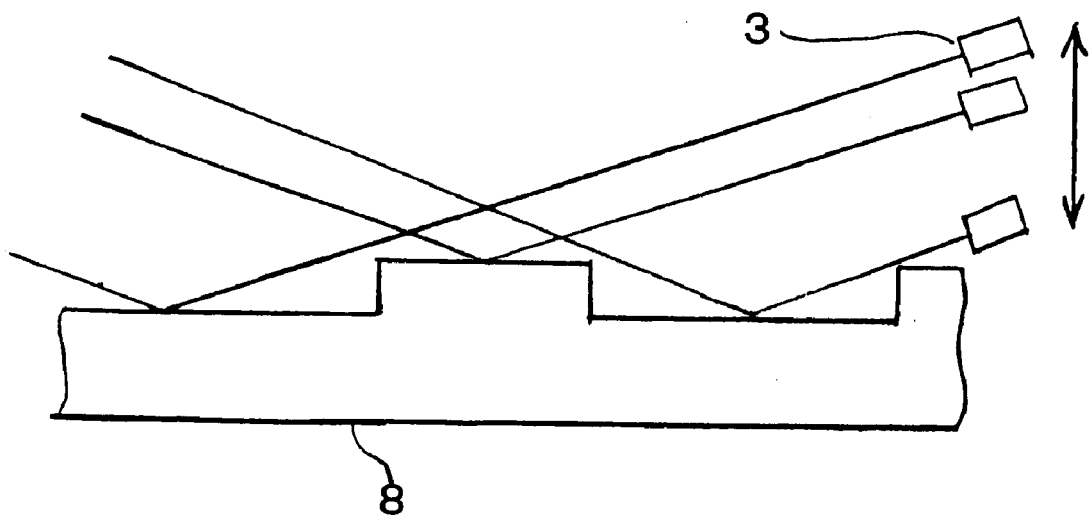
FIGS. 13A and 13B show an explanatory view relating to measurements of a thickness of an objective and an amount of gaps.
Figure 13B:
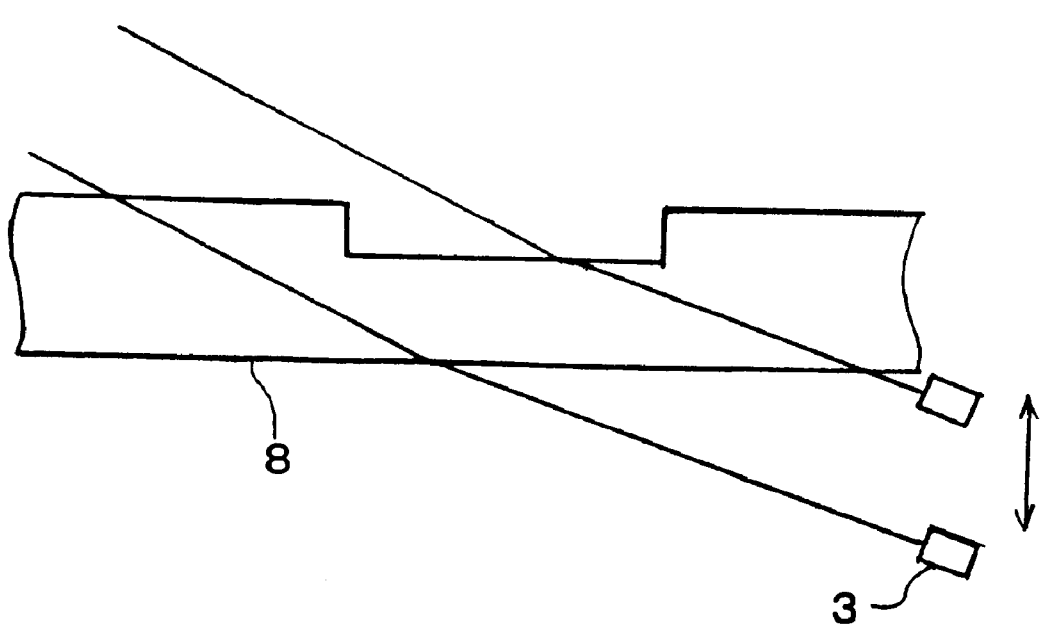
Figure 14:
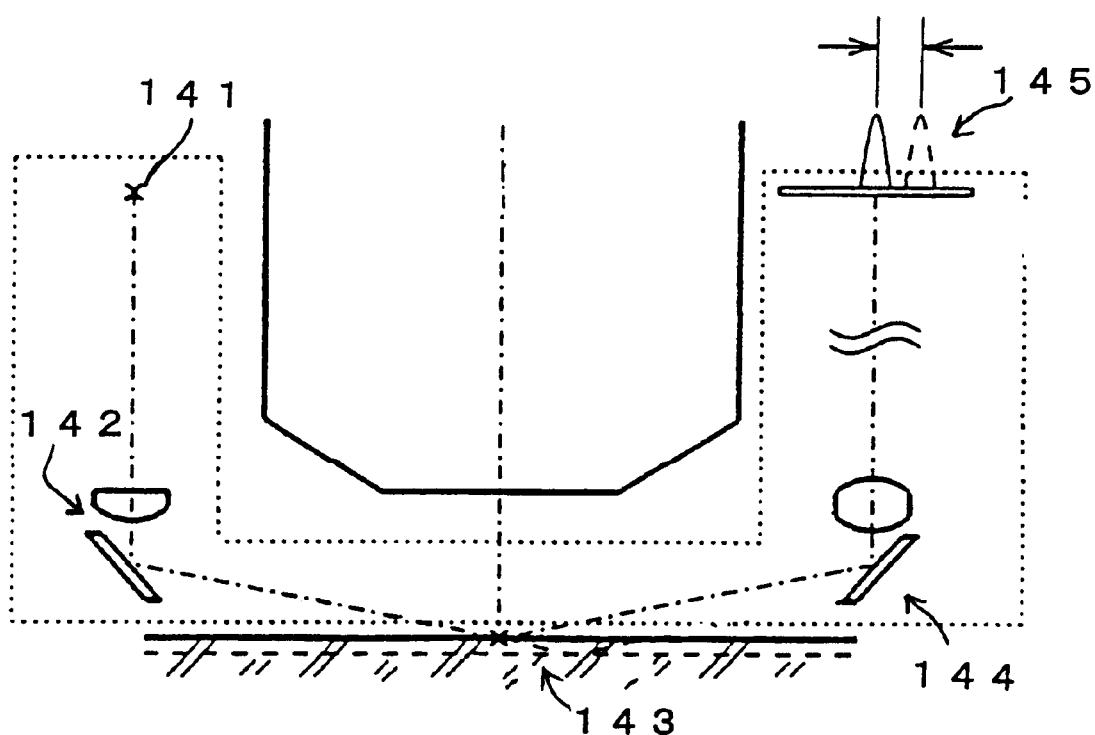
FIG. 14 shows a principle of an operation of an optical lever system.

As shown in FIGS. 13A and 13B, an explanatory view concerning the measurements of a thickness of an objective and a gap amount is shown.

As shown in FIG. 13A, by measuring the positions of the upper and lower surfaces of the objective individually, the thickness of the substrate and the gap can be measured. Furthermore, as shown in FIG. 13B, when the objective is formed of a transmittable material, the displacement can be measured at the positions of the surface or back surface by, for example, utilizing a refraction of the irradiation light. In addition, it can also be applied to the measurement of its thickness and gap.

If the movement amount can be beforehand forecasted, a plurality of interference measurement apparatuses of the present invention are provided and the relative positions of these apparatuses are understood, whereby with the measurements of the displacements at plural spots the dynamic range can be widened without the provision of the relative movement section 9. Moreover, a constitution comprising the relative movement section 9 can also be applied to this. Noted that a movement mechanism moving the objective in a lateral direction can be additionally provided.

The number of branches of the waveguide of the interference measurement probe is not limited to two but the branches of three or more can be provided. Moreover, the modulation sections of two or more can also be provided. Moreover, dispositions in the x and y-directions as well as in the z-direction is possible so as to measure and control the displacement. By arranging one or a plurality of interference measurement probes at plural spots, two and threedimensional measurement and control are achieved. Moreover, the measurement section can measure and memorize a change with the passage of time and history as to the measured displacement and position.

It is further understood by those skilled in the art that the foregoing description is a preferred embodiment and that various changes and modifications may be made in the invention without departing from the spirit and scope thereof.

The contents of the Japanese patent application No. 9-314621 filed Oct. 31, 1997 including specification, claims and drawings are incorporated herein by reference.

What is claimed is:

1. An interference measurement apparatus comprising:
    a light source for emitting a coherent light;
    a substrate for forming an optical waveguide;
    an optical waveguide section which is formed on the substrate and, receives the coherent light from said light source, divides the coherent light into at least two luminous fluxes and emits the at least two luminous fluxes from the substrate;
    an irradiation section which receives the at least two luminous fluxes emitted from the optical waveguide section, and irradiates at least two irradiation luminous fluxes in different directions to form an interference light;
    a light receiving section for receiving the interference light by being disposed at a position where the at least two irradiation luminous fluxes interfere, thereby outputting a light receiving signal; and
    a measurement section which obtains displacement of the at least two luminous fluxes irradiated the said irradiation section and said light receiving section based on the light receiving signal outputted from said light receiving section.

2. The interference measurement apparatus according to claim 1, wherein said optical waveguide section includes:
    a modulation section which modulates at least one of the at least two luminous fluxes; and
    wherein the substrate is formed by a lithium niobate crystal substrate or a lithium tantalate crystal substrate, which exhibits an electro-optical effect.

3. The interference measurement apparatus according to claim 1, wherein said optical waveguide section includes:
    an incidence waveguide into which a coherent light from said light source section is incident, in a plane parallel with a plane including a displacement direction to be measured;
    a wave separation section which divides a light in said incidence waveguide into at least two luminous fluxes;
    at least two emission waveguides which emit the at least two luminous fluxes divided by said wave separation section in the plane;
    a modulation section which modulates at least one of the at least two luminous fluxes divided by said wave separation section; and
    wherein the substrate formed by a lithium niobate crystal substrate, which exhibits an electro-optical effect.

4. The interference measurement apparatus according to claim 1, wherein said irradiation section irradiates the at least two luminous fluxes divided by said optical waveguides onto an objective at different angles so as to approximately for m a beam waist on the objective.

5. The interference measurement apparatus according to claim 1, wherein said measurement section includes:
    a signal extraction section which extracts a fundamental signal of a frequency equal to a modulation frequency and a sub-signal of a frequency twice the modulation frequency among light receiving outputs of said light receiving section; and
    a displacement measurement section which obtains a displacement from phases of the fundamental signal and the sub-signal extracted by said signal extraction section.

6. The interference measurement apparatus according to claim 1, wherein said measurement section obtains a displacement of said irradiation section and said light receiving section based on an angle at which a direction or a vertical direction of an interference fringe intersects a displacement direction, the interference fringe being formed by the at least two irradiation luminous fluxes.

7. The interference measurement apparatus according to claim 1, further comprising:
    a relative movement section which allows said irradiation section or said light receiving section to relatively move each other in a direction intersecting an interference fringe,
    wherein said measurement section obtains a displacement based on the movement amount of said relative movement section and a light receiving output of said light receiving section.

8. The interference measurement apparatus according to claim 7, wherein said relative movement section is controlled so that a reflection or a transmission luminous flux from the objective is incident into said light receiving section in accordance with the relative movement amount, and makes a measurement range wide.

9. An interference measurement apparatus comprising:
a light source for emitting a coherent light;
a substrate for forming an optical waveguide;
an optical waveguide section which is formed on the substrate and, receives the coherent light from said light source, divides the coherent light into at least two luminous fluxes and emits the at least two luminous fluxes from the substrate;
an irradiation section which receives the at least two luminous fluxes emitted from said optical waveguide section, and irradiates the at least two irradiation luminous fluxes onto an objective at different angles, thereby forming an interference light;
a light receiving section for receiving the interference light by being disposed at a position where at least two reflection or transmission luminous fluxes interfere, the at least two reflection or transmission luminous fluxes being reflected from the objective or transmitting therethrough, thereby outputting a light receiving signal; and
a measurement section which obtains displacement of the at least two luminous fluxes irradiated by said irradiation section and the objective based on the light receiving signal outputted by said light receiving section.

10. The interference measurement apparatus according to claim 9, wherein said optical waveguide section includes:
a modulation section which modulates at least one of the at least two luminous fluxes; and
wherein the substrate is formed by a lithium niobate crystal substrate or a lithium tantalate crystal substrate, which exhibits an electro-optical effect.

11. The interference measurement apparatus according to claim 9, wherein said measurement section includes:
a signal extraction section which extracts a fundamental signal of a frequency equal to a modulation frequency and a sub-signal of a frequency twice the modulation frequency among light receiving outputs of said light receiving section; and
a displacement measurement section which obtains a displacement from phases of the fundamental signal and the sub-signal extracted by said signal extraction section.

12. The interference measurement apparatus according to claim 9, further comprising:
a relative movement section which allows said irradiation section or said light receiving section to relatively move each other in a direction intersecting an interference fringe,
wherein said measurement section obtains a displacement based on the movement amount of said relative movement section and a light receiving output of said light receiving section.

13. An interference measurement probe, comprising:
a substrate for forming an optical waveguide;
an optical waveguide section which is formed on the substrate and, receives a coherent light, divides the coherent light into at least two luminous fluxes and emits the at least two luminous fluxes from the substrate; and an irradiating section which receives the at least two luminous fluxes emitted by said optical waveguide and irradiates at least two irradiation luminous fluxes at different directions, thereby forming a measurement region where the at least two irradiation luminous fluxes interfere.

14. The interference measurement probe according to claim 13, wherein said optical waveguide section includes:
a modulation section which modulates at least one of the divided at least two luminous fluxes; and
wherein the substrate is formed by a lithium niobate crystal substrate or a lithium tantalate crystal substrate, which exhibits an electro-optical effect.

15. The interference measurement probe according to claim 13, wherein
said optical waveguide includes:
the substrate formed by a lithium niobate crystal substrate or a lithium tantalate crystal substrate, which exhibits an electro-optical effect;
an incidence waveguide into which a coherent light from said light source is incident in a plane parallel with a plane including a displacement direction to be measured;
a wave separation section which divides a light in said incidence waveguide into at least two luminous fluxes;
at least two emission waveguides which emits the at least two luminous fluxes in the plane, the at least two luminous fluxes being divided by said wave separation section; and
a modulation section which modulates at least one of the at least two luminous fluxes divided by said wave separation section.

16. An interference measurement control system comprising:
a light source section emitting a coherent light;
a substrate for forming an optical waveguide;
an optical waveguide section which is formed on the substrate and, receives the coherent light from said light source section, divides the coherent light into at least two luminous fluxes and emits the at least two luminous fluxes from the substrate;
an irradiation section which receives the at least two luminous fluxes emitted by said optical waveguide section, and irradiates the at least two irradiation luminous fluxes at different directions, thereby forming an interference light;
a light receiving section for receiving the interference light by being disposed at a position where the at least two irradiation luminous fluxes interfere, thereby outputting a light receiving signal;
a measurement section which obtains displacements of at least two luminous fluxes irradiated by said irradiation section and said light receiving section based on the light receiving signal outputted from said light receiving section;
a driving section which allows said light receiving section to change its position; and
a control section which controls said driving section based on a measurement result by said measurement section so that said driving section moves to a position where an intensity of an interference light received by said light receiving section becomes maximum.

17. The interference measurement control system according to claim 16, wherein said optical waveguide section includes:

a modulation section which modulates at least one of the divided at least two luminous fluxes; and wherein substrate is formed by a lithium niobate crystal substrate or a lithium tantalate crystal substrate, which exhibits an electro-optical effect.

18. The interference measurement control system according to claim 16, wherein said measurement section includes:

a signal extraction section which extracts a fundamental signal of a frequency equal to a modulation frequency and a sub-signal of a frequency twice the modulation frequency among light receiving outputs of said light receiving section; and a displacement measurement section which obtains a displacement from phases of the fundamental signal and the sub-signal extracted by said signal extraction section.

19. The interference measurement control system according to claim 16, further comprising:

a relative movement section which allows said irradiation section or said light receiving section to relatively move each other in a direction intersecting an interference fringe, wherein said measurement section obtains a displacement based on the movement amount of said relative movement section and a light receiving output of said light receiving section.

20. An interference measurement control system comprising:

a light source section emitting a coherent light;

a substrate for forming an optical waveguide;

an optical waveguide section which is formed on the substrate and, receives the coherent light from said light source section, divides the coherent light into at least two luminous fluxes and emits the at least two luminous fluxes from the substrate;

an irradiation section which receives the at least two luminous fluxes emitted by said optical waveguide section, and irradiates the at least two irradiation luminous fluxes onto an objective at different angles, thereby forming an interference light;

a light receiving section for receiving the interference light by being disposed at a position where at least two reflection or transmission luminous fluxes interfere, the at least two reflection or transmission luminous fluxes being reflected from the objective or transmitting therethrough, thereby outputting an light receiving signal;

a measurement section which obtains a displacement of at least two luminous fluxes irradiated by said irradiation section and the objective based on the light receiving signal outputted from said light receiving section;

a driving section which allows the objective to change its position; and a control section which controls said driving section based on a measurement result by said measurement section so that said driving section moves to a position where an intensity of an interference light received by said light receiving section becomes maximum.

* * * * *